(12) United States Patent
Hiestermann et al.

(10) Patent No.: US 9,176,983 B2
(45) Date of Patent: *Nov. 3, 2015

(54) METHOD AND SYSTEM FOR CROSS-REFERENCING AND DEDUPLICATING OBJECTS IN MULTIPLE MAP BUILDING BLOCKS

(71) Applicant: TomTom Germany GmbH & Co. KG, Harsum (DE)

(72) Inventors: Volker Hiestermann, Laatzen (DE); Hans-Ulrich Otto, Hildesheim (DE)

(73) Assignee: TOMTOM GERMANY GMBH & CO. KG, Harsum (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/530,919

(22) Filed: Nov. 3, 2014

(65) Prior Publication Data

US 2015/0052149 A1 Feb. 19, 2015

Related U.S. Application Data

(63) Continuation of application No. 13/515,818, filed as application No. PCT/EP2010/069287 on Dec. 9, 2010, now Pat. No. 8,918,413.

(60) Provisional application No. 61/286,036, filed on Dec. 14, 2009.

(51) Int. Cl.
*G06F 17/30* (2006.01)
*G01C 21/32* (2006.01)

(52) U.S. Cl.
CPC .......... *G06F 17/30241* (2013.01); *G01C 21/32* (2013.01); *G06F 17/30333* (2013.01)

(58) Field of Classification Search
None
See application file for complete search history.

(56) References Cited

U.S. PATENT DOCUMENTS 6,246,417 B1 6/2001 Kambe et al.
7,949,330 B2 5/2011 Yuhara et al.
(Continued)

FOREIGN PATENT DOCUMENTS

CN 1212409 A 3/1999
CN 1882938 A 12/2006
(Continued)

OTHER PUBLICATIONS

XP002626952—Yurx: "Readme.lxt of program POI Duplicate Finder-Remover", Jul. 17, 2009 Retrieved from the Internet: URL:http://sourceforge.nel/projects/poi-dup-finder/ [retrieved on Mar. 8, 2011].
(Continued)

*Primary Examiner* — Wilson Lee

(57) ABSTRACT

A system and method for providing a digital map database wherein multiple instances of geocoded objects pertaining to points of interest (POI) and/or three-dimensional (3D) objects contained within one or more building blocks are compared to find undesirable duplicate geocoded objects. Cross-referencing information is stored and preference information about which geocoded object or object property/attribute should be used is assessed to determine priority for selection or presentation on the display screen of a navigation device or other suitable computing device. Cross-references can be pre-calculated at compile time or calculated on-the-fly by the navigation application at run time and may be persistently stored in dedicated data structures. When duplicate geocoded objects are found, only the most accurate information or a super set of (attribute) information is used by applications or presented to a user thereby preventing confusion.

20 Claims, 5 Drawing Sheets

(56) References Cited

U.S. PATENT DOCUMENTS

| | | |
|---|---|---|
| 8,289,347 B2 | 10/2012 | Deluca et al. |
| 8,630,991 B2 | 1/2014 | Rao |
| 8,918,413 B2 * | 12/2014 | Hiestermann et al. ........ 707/763 |
| 2007/0049260 A1 | 3/2007 | Yuhara et al. |
| 2007/0260628 A1 | 11/2007 | Fuchs et al. |
| 2007/0276845 A1 | 11/2007 | Geilich |
| 2008/0291205 A1 | 11/2008 | Rasmussen et al. |
| 2009/0210388 A1 | 8/2009 | Elson et al. |
| 2011/0025716 A1 | 2/2011 | Deluca et al. |
| 2012/0254156 A1 | 10/2012 | Rao |

FOREIGN PATENT DOCUMENTS

| | | |
|---|---|---|
| CN | 101135566 A | 3/2008 |
| CN | 101438231 A | 5/2009 |
| CN | 101561816 A | 10/2009 |
| JP | 2005227117 A | 8/2005 |
| JP | 2005234991 A | 9/2005 |
| JP | 2007205894 A | 8/2007 |
| JP | 2008122183 A | 5/2008 |
| JP | 2010086399 A | 4/2010 |
| KR | 20070090410 A | 9/2007 |

OTHER PUBLICATIONS

International Search Report issued Mar. 18, 2011 for International Application No. PCT/EP2010/069287.

* cited by examiner

METHOD AND SYSTEM FOR CROSS-REFERENCING AND DEDUPLICATING OBJECTS IN MULTIPLE MAP BUILDING BLOCKS

CROSS REFERENCE TO RELATED APPLICATIONS

The present application is a continuation of U.S. patent application Ser. No. 13/515,818, filed on Jun. 14, 2012, which is the National Stage of International Application No. PCT/EP2010/069287, filed Dec. 9, 2010 and designating the United States, which claims benefit to U.S. Provisional Patent Application Ser. No. 61/286,036 filed on Dec. 14, 2009. The entire contents of these applications are incorporated herein by reference.

BACKGROUND OF THE INVENTION

1. Field of the Invention

This invention relates to methods and systems for providing digital maps, and more particularly toward a method and system for enhancing digital map content with information provided by one or more third party sources.

2. Related Art

The use of digital geographic or map data has become commonplace in modern society. Commonly referred to as "electronic maps" or "digital maps", this type of data is now used in a wide variety of applications, such as land-based vehicular navigation, route planning, etc. Internet-based business-to-consumer (B2C) companies now use digital maps to direct customers to theaters, stores, restaurants, and other commercial businesses. Digital maps are also often used in commercial settings, for example, to calculate routes for delivery drivers, or to provide directions for emergency and medical crews to follow when responding to emergency calls.

Increasingly, digital map providers have become gatherers and organizers of an ever greater variety of map data, including for example street addresses, transportation networks, water bodies, parklands, political districts, census data, demographic information, commercial businesses, and entertainment facilities. At the same time, the variety of uses for this map data has also expanded to include such applications as in-car driving assistance, cellular phone-based navigation, locally-focused news, media, and yellow-page information services. With this increase in content and utility, it has become evident that combining the underlying map data with other sources of location-related information can provide a more useful end-product.

A typical approach to map data integration is to create "overlay maps", in which a digital map is used as a base map, and then additional information from one or more sources is laid over the base map to provide at least an illusion of a more complex map. This is the approach used in many Internet-based map information systems. For example, if a company wishes to provide an online restaurant-search utility, they can provide a base map "A" (which can be a typical map with streets, parks, and other such locations). They can then overlay a second map "B" that contains restaurant information and reviews. Maps A and B may or may not come from the same source and provisioning to a user may or may not be done independently. In response to a user request for a restaurant-map, the company can display a portion or all of map A overlaid with a portion or all of map B, such that the matching restaurants are pinpointed as flags on the map. This process can be extended to overlay many maps atop the base map, giving the perception of a very information-rich map.

However, a problem with this technique is that maintaining consistency between the various maps to be integrated is difficult because map information is being integrated from different sources. When a single application uses information gathered from a variety of data collection efforts, there is a risk of losing consistency. This risk is present even if the data is collected from in-house resources, but is magnified when the data is collected from third parties. One approach might be to maintain or store all of the desired information in a common repository or database. However, as increasing amounts of data are added the database could become quite complex and cluttered, so that performance and maintenance requirements would become unacceptable. In many instances, the third-party is also the entity that is most capable of maintaining the accuracy and freshness of their particular data. This accuracy could be lost if the data is integrated into a monolithic database that no longer receives frequent updates from the original data source.

These considerations of accuracy and consistency come increasingly into play when the issue of geospatial data is considered. For example, a hotel chain that is trying to attract customers considers it extremely important to provide their customers with accurate directions. For some, an interactive local map may be one of their most important sources of advertising. Local knowledge is also considered the best knowledge when it comes to representing local information, such as neighborhood or community information. In each of these instances, a third-party generating its own local data may be better suited to create and update locally-oriented or focused data, than might a centralized map data company operating a single database.

Despite the disadvantages of centrally-stored or monolithic map databases, if a company is to provide the end user with the desired integration of information from a variety of data sources, there must still be some form of central coordination of this data guaranteeing that the data collection efforts are standardized and comprehensive.

One example of a prior attempt to address these issues generally is described in US Publication No. 2008/0215524 by Fuchs et al., published Sep. 4, 2008, the entire disclosure of which is hereby incorporated by reference. Fuchs et al. discloses a "Virtual Database System" (VDB) in order to balance the apparently opposing considerations between allowing integration of map data from various sources in a consistent manner, while simultaneously ensuring that the entity best able to support a particular data source retains control over that data. The VDB allows sharing of control and ownership (or in some instances delegating control and ownership) for each geocoded object that will go into the final overall map product between a digital map provider and one or more third-parties, or between several third-parties. In accordance with an embodiment, the VDB environment enables third-party data providers to easily associate or geocode their data (referred to as "third-party-files") onto a digital map provider's "base map" or "file-of-reference", thereby allowing for the creation of dynamic relationships between digital map features and other third-party data providers. The VDB can also be accessed by application providers to purchase and retrieve seamlessly integrated data from multiple vendors through a single mechanism, and then provide that data to an end user. In certain embodiments, the integration can be performed in a dynamic or real-time fashion, receiving up-to-date information from the various sources, creating links, and composing virtual maps, as needed or on-demand. An additional benefit is that, since the information is linked between the map providers and the various third parties, whenever an item of information or a link between items is updated in either the file-of-reference or in one of the third-party files, that updated information can be propagated back to all of the third-parties for further use by them in their own software applications.

Despite these advances in the art, there remains a need to identify and resolve duplicate objects as they appear. Navigation system suppliers and others in the industry may prefer that the map vendors solve this issue within their map products, i.e., prior to compilation into a Navigation Data Standard (NDS) or other physical storage format (PSF). Due to advancing concepts for connected and social navigation, including content personalization and user-defined content downloads, map vendors find it increasingly difficult to guarantee content uniqueness with persistent reliability. There is therefore a need in the art to provide systems and methods by which content from multiple sources can be assessed for duplicates, and by which priorities can be assigned to found duplicate objects so that the most reliable/rich information only is ascertained for actual use, such as presentation for display, and/or later use by flagging or logging said established information.

SUMMARY OF THE INVENTION

A system and method is provided for enriching the content in a digital map by integrating data in the form of geocoded objects from one or more external sources in a digital map. The digital map contains digitized information corresponding to a network of roads in reality. The digital map includes at least one building block containing a digitized geocoded object corresponding a particular object or location in reality. A supplemental building block contains a digitized geocoded object corresponding to the same object or location in reality. (Or alternatively two geocoded objects corresponding to the same object or location in reality are contained in the same building block.) The supplemental building block is integrated into the digital map. The improvement comprises identifying two or more geocoded objects from respective building blocks (or within the same building block) that correspond to the same object in reality. A priority value is assigned to each geocoded object, and then the priority values are compared to one another. The one geocoded object (or attribute thereof) having the highest priority value is selected for use in the digital map or for persistent storage of established priorities among the plurality of identified datasets.

This invention addresses the need for managing geocoded objects such as three-dimensional (3D) and point of interest (POI) content in a digital map when third parties (i.e., external to the digital map provider) submit or propose updates for geocoded objects concurrent with those existing already in the digital map. The methods and data structure strategies represented by this invention can play a beneficial role in the compilation processes of the navigation map (e.g., using the Navigation Data Standard—NDS) and/or in the navigation application. Principles of this invention may be applied equally for hosted data, with multiple POI or 3D object databases, which may lead to cross references between duplicate geocoded objects in either a pre-processing operation or as an on-the-fly process at run-time.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
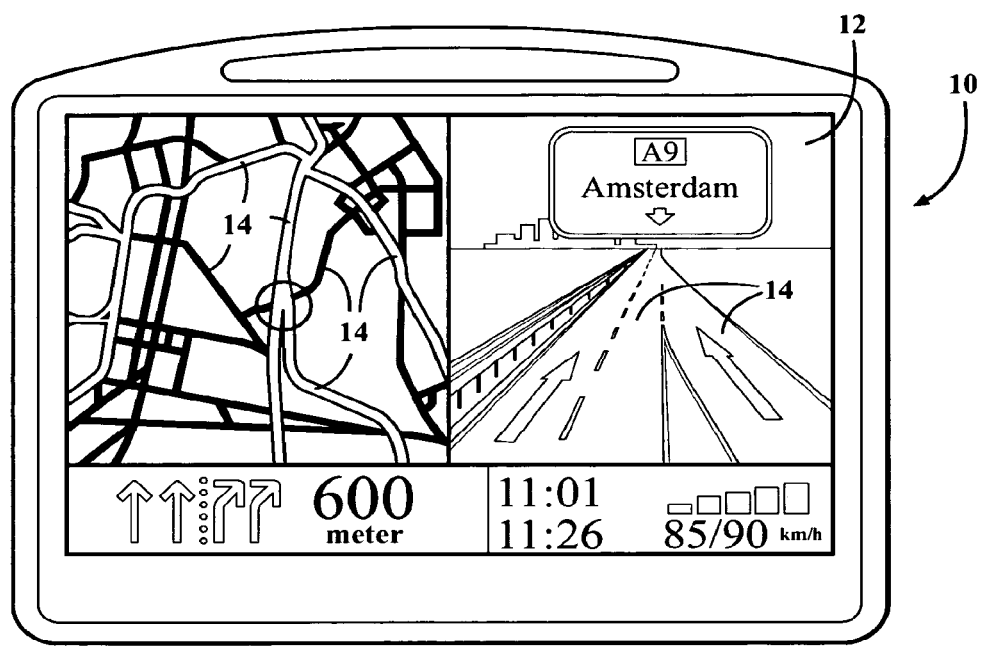
FIG. 1 is an exemplary view of a display screen for a navigation device according to one embodiment of this invention configured to present map data information.

Referring to the Figures, wherein like numerals indicate like or corresponding parts throughout the several views, this invention pertains to navigation devices configured to utilize digital maps and which may or may not be combined with accurate positioning data from GPS or other data streams. This invention is not limited to mobile navigation devices like that suggested, for example, at 10 in FIG. 1, but can be implemented through any device capable of accessing digital maps and presenting same on a display screen including personal computers, in-dash automotive infotainment systems, cellular phones and other hand-held devices. The navigation system 10 shown in FIG. 1 includes a display screen 12 portraying a portion of the stored digital map as a network of roads 14. A traveler having access to a GPS-enabled navigation device 10 may be generally located on the digital map close to or with regard to a particular road 14 or segment thereof. Alternatively, a person accessing the digital map through a non-GPS enabled device, like a desktop computer for example, will not be located with respect to the map but may otherwise access content from the digital map.

Digital map providers continuously strive to improve and update their maps. Inaccurate or incomplete information contained in the digital map can result in poor or erroneous navigation instructions and lead to undesirable routing/travel decisions. For the avoidance of doubt, this invention pertains to digital maps as used by all types of navigation systems, as well as all types of digital map applications which may include those accessible through internet enabled computers, tablet PCs, personal digital assistants (PDAs), cellular phones, portable navigation devices 10, in-dash car mounted navigation systems, and the like.

This invention provides a methodology for effectively managing three dimensional (3D) and point of interest (POI) content submitted via a building block in the digitized form of a geocoded object for inclusion in a digital map. The invention is particularly useful, although not exclusively useful, in connection with current efforts to standardize navigation databases. For example, the automotive PSF standardization initiative (PSI) has identified a modular range of data structures, called building blocks, for the different kinds of map content (e.g., map display, name, road geometry, routing data, ADAS attributes, POIs, 3D objects, 3D terrain models, etc.).

The term "building block", e.g. as defined in the NDS format, means a certain type or category of content (e.g. POIs, map display data, 3D data, name data, etc.), but not a data record for a given POI instance. The PSI has developed a Navigation Data Standard (NDS) format in connection with these different types of building blocks. Each building block may contain one or more geocoded objects. Generally stated, a geocoded object is a dataset of related information or attributes pertaining to a given POI, 3D object, or other content feature. The term geocoded object may be referred to as a georeferenced object. In a compiled NDS database, two or more geocoded objects pertaining to the same given feature in reality can occur in the same or in different building blocks. Examples may include: a POI building block with base POIs (such as provided by the digital map provider) coexisting with other POI building blocks originating from third party sources (e.g., Yellow Pages); and multiple building blocks for 3D objects that are present concurrently (e.g., block models as well as 3D landmarks from other sources).

Figure 2:
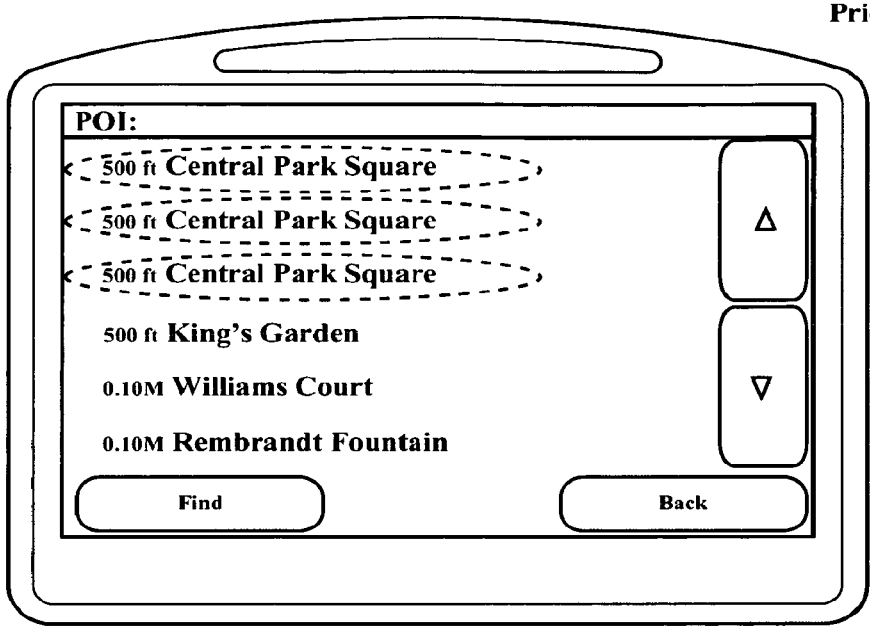
FIG. 2 is an exemplary view of a display screen of the portable navigation device shown in FIG. 1 according to the prior art, wherein multiple point of interest (POI) entries corresponding to the same object in reality are shown in succession leading to possible confusion.
Figure 3:
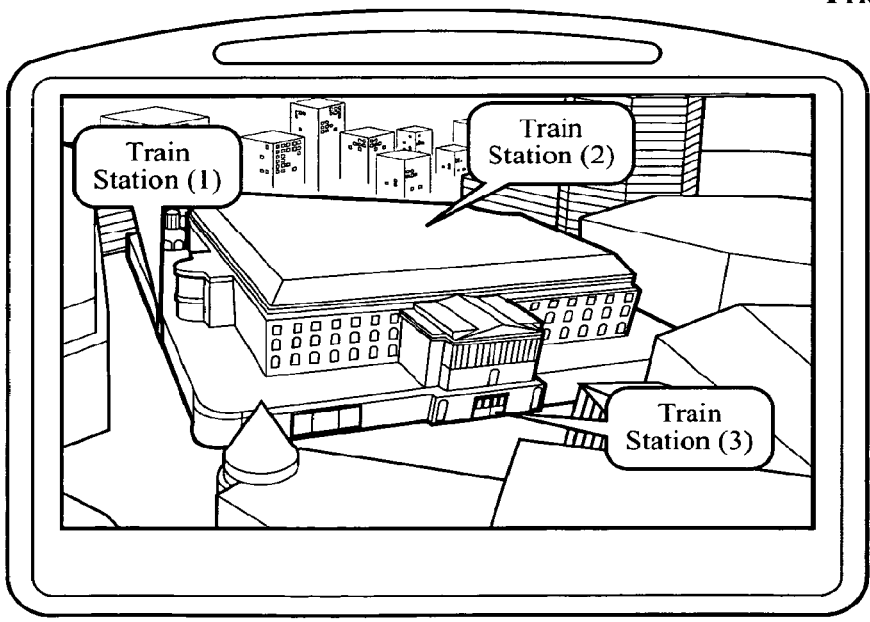
FIG. 3 is a view of a prior art display screen showing for example a 3D view of an object in reality identified with duplicate labeling features originating from different data sources and creating the potential for confusion.

The conversion of and proposals for NDS specifications, for example, did not foresee data structures or concepts for storing and handling information about duplicate geocoded objects. This puts the burden on NDS applications to prevent multiple entries for the same POI on a search list (for example), such as shown circumscribed with broken lines in FIG. 2, and to prevent the multiple display of icons/3D buildings which actually refer to the same object, such as shown in FIG. 3. These can be confusing and/or annoying to a person reading the information presented upon the display screen 12. Furthermore, a practical solution to this problem must be persistent, in that duplicate geocoded object issues must be solved not only at run-time, but also would be logged or stored for future reference. Alternatively, the geocoded object de-duplication effort may occur at NDS compile time, leading pre-compiled information for future reference at run time.

The concepts of this invention propose extended data structures either inside or outside concerned building blocks of the NDS or any other appropriate physical storage format (PSF) dealing with: storage of cross-referencing information; and preference information about which geocoded object (or object property or object attribute) should have priority for selection and presentation. As will be described, the preference information can be based upon the most recent updates, richness of attributes, linkage to dynamic auxiliary content, or other relevant factors.

Figure 4:
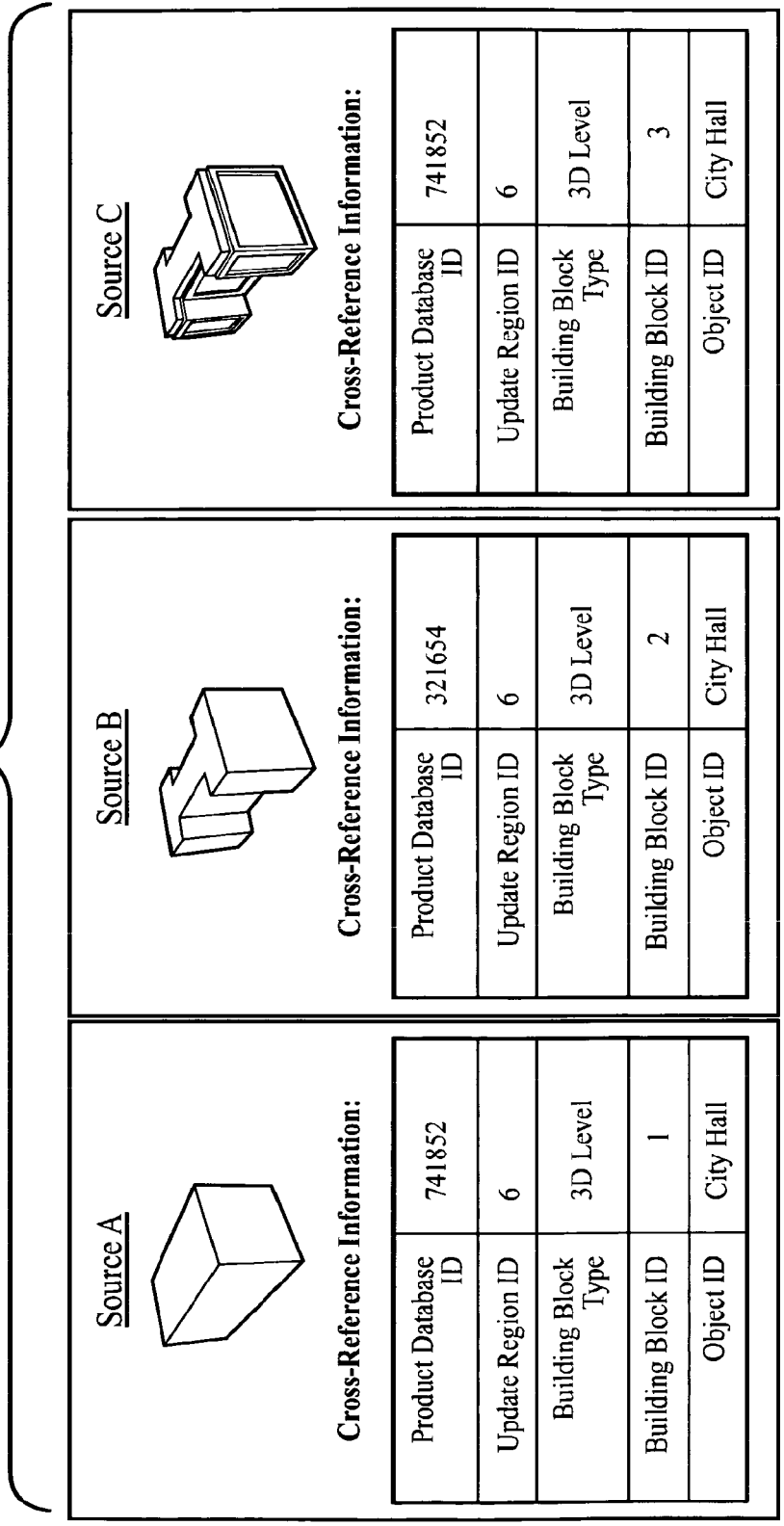
FIG. 4 is an exemplary comparison of 3D objects corresponding to the same object in reality but originating from different sources (sources A, B and C) together with respective cross-reference information enabling identification of duplicates.
Figure 5:
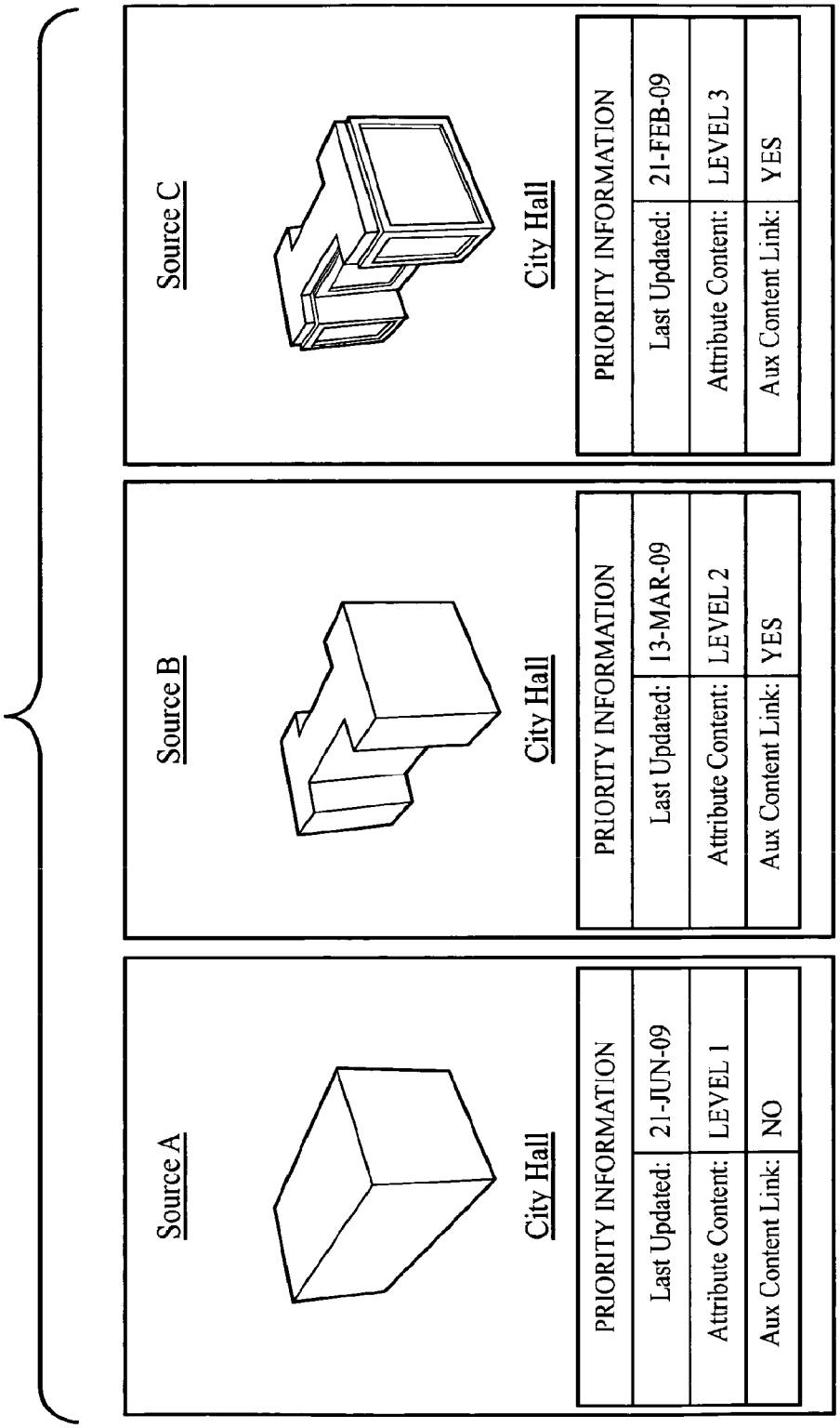
FIG. 5 is another view of the duplicate 3D objects from multiple sources as shown in FIG. 4, and further including priority information assigned to each of the duplicate objects and used for comparison purposes.

According to one embodiment of this invention, the cross-referencing information is stored on a global level, e.g., in a table, as an overhead data structure to establish cross-references between geocoded objects in different product databases. By way of definition, a product database is map content compiled by a particular content provider. Each product database is handled as a separate instance of a given PSF map database. The referenced data or table may include the following object information: Object 1, Object 2, and supplementary information. Reference data for Objects 1 and 2 may include such details as: Product Database Identification, Update Region Identification, Building Block Type, Building Block Identification and Object Identification. This reference data is shown, for example, in FIG. 4. Supplementary information may include priority data and the like.

These cross-references are preferably pre-calculated at compile time, when different building blocks are generated together, or alternatively calculated on-the-fly by the navigation application at run-time. Results may be stored persistently in such a table by the navigation application. Principles for identifying building blocks originating from different data sources that contain, respectively, geocoded objects corresponding to the same object in reality may further include considerations based on spatial proximity, comparison of object properties, attributes, object types, object class, object name, object address, etc.

According to another embodiment of this invention, a map vendor and/or NDS compilation house may compile an all-in-one NDS product, wherein POI content and 3D content is subdivided into more than one building block and cross-reference information is generated. As before, however, the NDS product is delivered to the market divided into a core product (e.g., none or a single POI building block) and add-on products (e.g., extended POI content) for later download by a connected navigation device 10. An NDS product used by a navigation device 10 is thus extended with user-source content which may be in the form of directories, 3D object transfer from Google Earth, etc. This user-source content is stored in separate building block(s). The navigation application executed by the device 10 determines at run-time if duplicate geocoded objects exist in one or more building blocks. If duplicate geocoded objects are identified, the navigation application logs the cross-referencing information in the overhead structures for future reuse. The user may be asked to confirm whether or not geocoded objects found by the navigation application are indeed duplicates.

In another embodiment, cross-reference information is provided for a given building block, such as for content relating to POIs or 3D objects, with the intention to log and maintain cross-references only within said building block. Given that the content of said building block may be updated and extended over time, any pre-compiled cross-references (if ever established) can be dynamically maintained by additional cross-references determined at run-time.

Different embodiments of cross-referencing data structures may be suitable. In one case, data structures may be implemented outside the actual building blocks, and may link objects from two or more other building blocks. In another implementation, data structures are inside actual building blocks, either as one way implementation in one building block only, or as two way implementation in two building blocks with cross-referenced geocoded objects. These data structures may link to geocoded objects in one or more other building blocks.

According to the invention, extra overhead (in the form of cross-referencing and priority information) is added to the data structures for 3D objects and POIs inside a navigation run-time format like NDS where a 3D building block or a POI building block can occur multiple times, and where consistency or uniqueness can only be managed inside a building block but not between different building blocks. The overhead data structures according to this invention will fill a conceptual gap in NDS by providing a means for persistent cross-referencing between duplicate geocoded objects in different building blocks, and by structurally supporting run-time duplication efforts by a navigation application, which may be subsequently executed through a navigation device 10.

Figure 6:
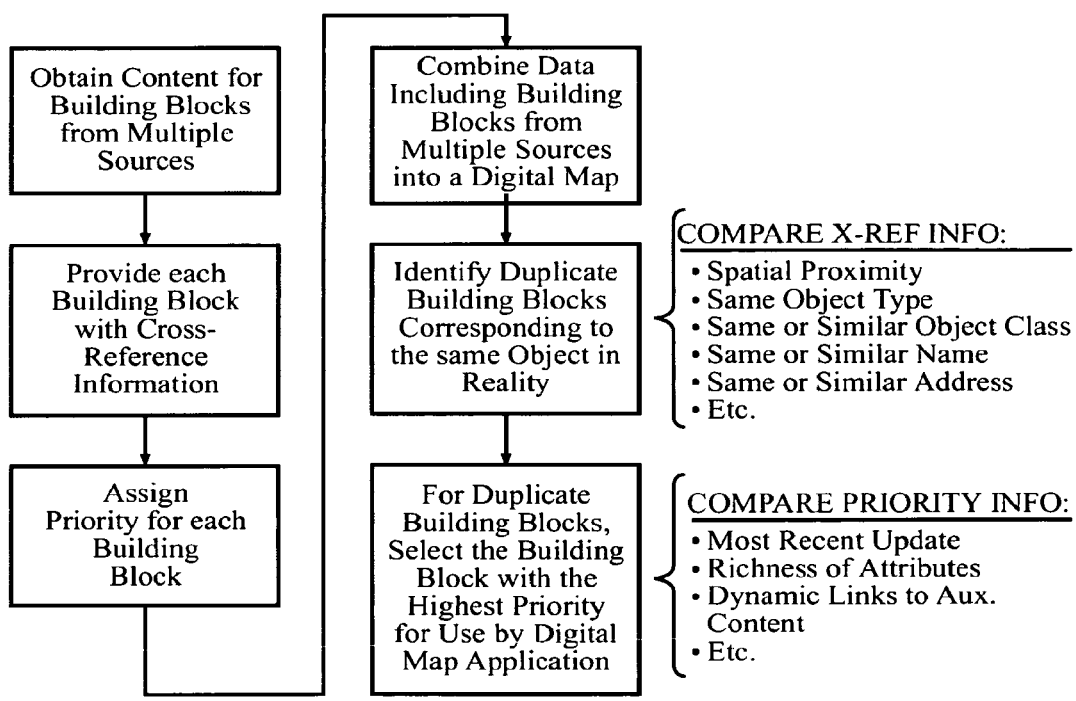
FIG. 6 is a simplified flow diagram describing the basic steps of this invention.

FIG. 6 describes, in simplified terms, the method steps of this invention as described above. The method and data structures proposed herein for cross-referencing and de-duplication can play a role in the NDS compilation process. Depending on the product concept, a map vendor may choose to populate multiple POI building blocks (or 3D object building blocks, etc.). Furthermore, the method and data structures herein can be used in the navigation application in terms of both software development and run-time operation. Corresponding principles may also be applied for hosted data (using formats other than NDS), with multiple POI or 3D object databases, which in a pre-process or as a living process at run-time leads to cross-references between corresponding (i.e., duplicate) geocoded objects.

Accordingly, the methods of this invention, together with devices configured to implement the method and digital map database systems which implement the method may be used to identify duplicate geocoded objects originating within the same building block or from different building blocks, assign appropriate priority values, compare those priority values and select the one building block, or the one attribute/property of a specific instance of a geocoded object within the building block, that has the highest priority value for use in the application, which may include exclusive display on the display screen 12 of a suitable device 10 in the form of "cleaned-up" destination listings or map renderings.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A non-transitory computer-readable medium which stores a set of instructions which when executed performs a method for enriching the content in a digital map by integrating data in the form of building blocks from one or more sources into a digital map, the method executed by the set of instructions comprising:
    integrating a supplemental building block containing at least one digitized geocoded object pertaining to an object in reality into a digital map stored on a computer, said digital map containing digitized information including at least one building block containing a digitized geocoded object corresponding to the same object in reality;
    identifying the geocoded objects from respective building blocks that correspond to the same object in reality;
    assigning a priority value for each identified geocoded object;
    comparing the priority values to one another;
    selecting the one geocoded object from among the plurality of identified geocoded objects that has the highest priority value for use by a digital map or navigation application; and
    storing, in the digital map, cross reference information identifying the identified geocoded objects and preference information identifying the selected one geocoded object.

2. The non-transitory computer-readable medium of claim 1, wherein the at least one building block and the supplemental building block refer to a common building block, and wherein the geocoded objects that correspond to the same object in reality are contained in the same building block.

3. The non-transitory computer-readable medium of claim 1, wherein said assigning a priority value includes assessing at least one of:
    a most recent date at which the digitized information for each respective geocoded object was last updated;
    a richness level of attribute content for each respective geocoded object;
    an existence of dynamically linked auxiliary content for each respective geocoded object; and
    one or more conditions for using each respective geocoded object.

4. The non-transitory computer-readable medium of claim 1, wherein said identifying geocoded objects from respective building blocks that correspond to the same object in reality includes evaluating the spatial proximity of geocoded objects relative to a road network and/or relative to each other.

5. The non-transitory computer-readable medium of claim 1, wherein said identifying geocoded objects from respective building blocks that correspond to the same object in reality includes evaluating an assigned object name and/or object street address for each respective building block.

6. The non-transitory computer-readable medium of claim 1, wherein said assigning a priority value and/or identifying geocoded objects from respective building blocks that correspond to the same object in reality includes a user interaction for selecting a particular instance of a geocoded object over another.

7. A non-transitory computer-readable medium which stores a set of instructions which when executed performs a method for enriching the content in a digital map by integrating data in the form of building blocks from one or more sources into a digital map, the method executed by the set of instructions comprising:
    integrating a supplemental building block containing at least one digitized geocoded object attribute pertaining to an attribute of an object in reality into a digital map stored on a computer, said digital map containing digitized information including at least one building block containing a digitized geocoded object attribute corresponding to the same object attribute in reality;
    identifying the geocoded object attributes from respective building blocks that correspond to the same object attribute in reality;
    assigning a priority value for each identified geocoded object attribute;
    comparing the priority values to one another;
    selecting the one geocoded object attribute from among the plurality of identified geocoded object attributes that has the highest priority value for use by a digital map or navigation application; and
    storing, in the digital map, cross reference information identifying the identified geocoded object attributes and preference information identifying the selected one geocoded object attribute.

8. The non-transitory computer-readable medium of claim 7, wherein the at least one building block and the supplemental building block refer to a common building block, and wherein the geocoded object attributes that correspond to the same object in reality are contained in the same building block.

9. The non-transitory computer-readable medium of claim 7, wherein said assigning a priority value includes assessing the most recent date at which the digitized information for each respective geocoded object attribute was last updated.

10. The non-transitory computer-readable medium of claim 7, further comprising presenting at least a portion of the digital map upon a display screen of an electronic computing device, wherein the presentation includes displaying the building block content as a graphical representation of the object in reality.

11. An electronic computing device comprising:
    a processor arranged to:
        integrate a supplemental building block containing at least one digitized geocoded object pertaining to an object in reality into a digital map stored on a computer, said digital map containing digitized information including at least one building block containing a digitized geocoded object corresponding to the same object in reality;

identify the geocoded objects from respective building blocks that correspond to the same object in reality;

assign a priority value for each identified geocoded object;

compare the priority values to one another;

select the one geocoded object from among the plurality of identified geocoded objects that has the highest priority value for use by a digital map or navigation application; and store, in the digital map, cross reference information identifying the identified geocoded objects and preference information identifying the selected one geocoded object.

12. The device of claim 11, wherein the at least one building block and the supplemental building block refer to a common building block, and wherein the geocoded objects that correspond to the same object in reality are contained in the same building block.

13. The device of claim 11, wherein said assignment of a priority value includes assessing at least one of:

a most recent date at which the digitized information for each respective geocoded object was last updated;

a richness level of attribute content for each respective geocoded object;

an existence of dynamically linked auxiliary content for each respective geocoded object; and one or more conditions for using each respective geocoded object.

14. The device of claim 11, wherein said identifying of geocoded objects from respective building blocks that correspond to the same object in reality includes evaluating the spatial proximity of geocoded objects relative to a road network and/or relative to each other.

15. The device of claim 11, wherein said identifying of geocoded objects from respective building blocks that correspond to the same object in reality includes evaluating an assigned object name and/or object street address for each respective building block.

16. The device of claim 11, wherein said assignment of a priority value and/or identifying geocoded objects from respective building blocks that correspond to the same object in reality includes a user interaction for selecting a particular instance of a geocoded object over another.

17. An electronic computing device comprising:

a processor arranged to:

integrate a supplemental building block containing at least one digitized geocoded object attribute pertaining to an attribute of an object in reality into a digital map stored on a computer, said digital map containing digitized information including at least one building block containing a digitized geocoded object attribute corresponding to the same object attribute in reality;

identify the geocoded object attributes from respective building blocks that correspond to the same object attribute in reality;

assign a priority value for each identified geocoded object attribute;

compare the priority values to one another;

select the one geocoded object attribute from among the plurality of identified geocoded object attributes that has the highest priority value for use by a digital map or navigation application; and store, in the digital map, cross reference information identifying the identified geocoded object attributes and preference information identifying the selected one geocoded object attribute.

18. The device of claim 17, wherein the at least one building block and the supplemental building block refer to a common building block, and wherein the geocoded object attributes that correspond to the same object in reality are contained in the same building block.

19. The device of claim 17, wherein said assignment of a priority value includes assessing the most recent date at which the digitized information for each respective geocoded object attribute was last updated.

20. The device of claim 17 further comprising presenting at least a portion of the digital map upon a display screen of an electronic computing device, wherein the presentation includes displaying the building block content as a graphical representation of the object in reality.

\* \* \* \* \*